March 21, 1950  H. J. PICKER  2,501,086
CUSHION RUBBER BASE HORN WEIGHT
Filed Nov. 26, 1948
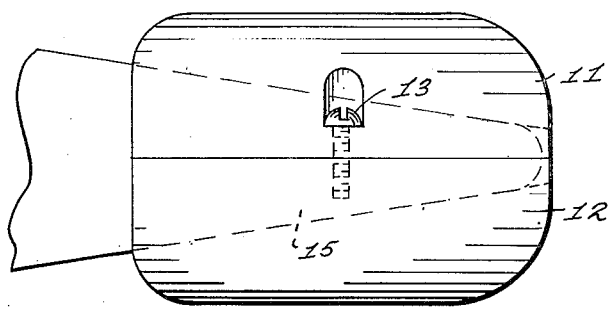
Fig. 1.
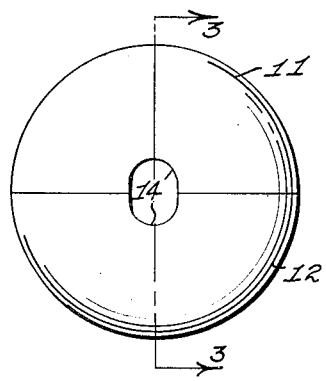
Fig. 2.
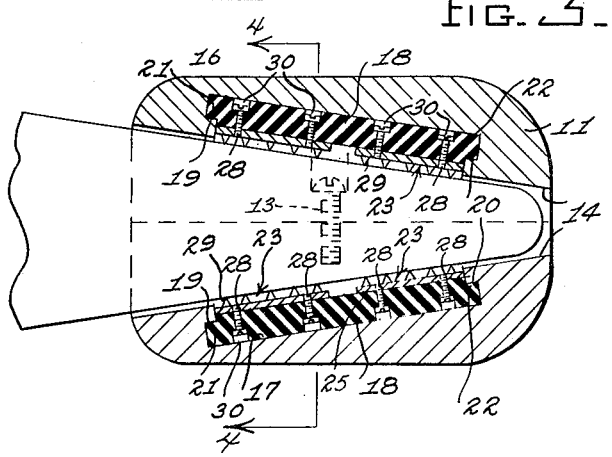
Fig. 3.
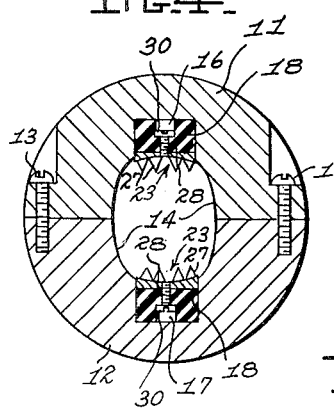
Fig. 4.
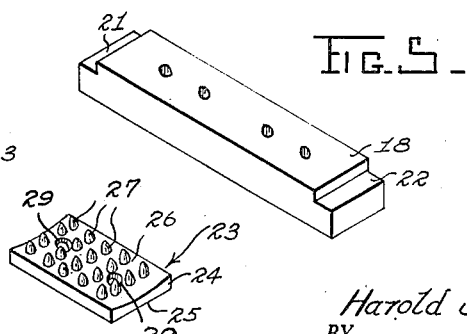
Fig. 5.
Fig. 6.
INVENTOR.
Harold J. Picker
BY
McMorrow, Berman & Davidson
ATTORNEYS Patented Mar. 21, 1950

2,501,086

UNITED STATES PATENT OFFICE 2,501,086

CUSHION RUBBER BASE HORN WEIGHT

Harold J. Picker, Springfield, Ohio

Application November 26, 1948, Serial No. 61,975

3 Claims. (Cl. 128—76)

This invention relates to horn weights for application to the horns of animals for the purpose of shaping them during periods of growth.

An object of this invention is the provision of a horn weight which is easy to apply to the horns of animals, such as cows.

Another object of this invention is to provide a horn weight, the gripping parts of which will not cause discomfort to the animal.

A further object of this invention is the provision of a horn weight whose gripping parts will not penetrate or substantially damage the outer insensitive layers of the horn, and therefore will not affect the underlying sensitive membranes of the horn.

Still further objects and advantages of the invention will be apparent from the following description, considered together with the accompanying drawing, in which drawing:

Figure 1 is a side elevational view of an embodiment of the invention as it appears when attached to the end of a cow's horn.

Figure 2 is an end view of the embodiment as it appears from the right side of Figure 1.

Figure 3 is a longitudinal sectional view along the line 3—3 of Figure 2.

Figure 4 is a cross sectional view along the line 4—4 of Figure 3.

Figure 5 is an isometric view of one of the rubber cushions.

Figure 6 is an isometric view of one of the gripping cleats.

Referring with more particularity to the drawing in which like numerals designate like parts the embodiment illustrated comprises a cylindrical member in two half sections 11 and 12 that are held together by means of screws 13.

The cylindrical member is provided with a longitudinal channel 14 tapering from one end to the other (from left to right as viewed in Figs. 1 and 3) and of the approximate size of the end of the horn 15 to which it is to be attached.

In the case of a cow's horn, the cross section is somewhat elliptical or oval and, accordingly, it is preferred that channel 14 have a similar elliptical or oval shape as shown in Figs. 2 and 4, with the major axis thereof perpendicular to the plane of separation of the two halves of the cylinder.

Within the cylinder there are provided two recesses 16 and 17 along the walls at opposite sides, preferably at the end of the ovals. Within each recess there is disposed a rubber cushion 18. The cushions are retained in their recesses by shoulders 19 and 20 that fit over recessed ends 21 and 22 of the cushions.

Against the outer sides of the cushions there are disposed metal cleats 23 each cleat consisting of a base plate 24, the back 25 of which is flat and the front face 26 having a slight concave curvature approximating the curvature of the horn of the animal against which it rests in use. From the face 26, a plurality of pointed members 27 project to grip the surface on the horn.

The cleats 23 are secured in position to the cushions 18 by means of screws 28 passing through the cushions from the back through to the front and being engaged with threaded apertures 29 in the cleats. The screws 28 are provided with heads 30 that are countersunk to a substantial depth in the cushions so as to be out of contact with the wall of the cylinder at all times when the device is in use.

To use the device the two half sections 11 and 12 of the cylinder are placed on opposite sides of the horn to which it is to be attached and the screws 13 put in place and tightened to hold the two sections together against the horn. As the device is tightened about the horn the projections 27 grip the surface of the horn, but damage to the horn is prevented since the cushions yield against excess pressure. By these means it is assured that the membranes of the horn beneath the outer layer thereof will not be affected.

It is to be understood that, although the invention has been described as comprising rubber cushions, other suitable resilient yieldable means may be employed including springs.

Having thus described the invention, I claim:

1. A horn weight comprising a cylindrical member having a tapered longitudinal channel therein, cleats within said member, and rubber cushions recessed in the member for resiliently supporting the cleats.

2. A horn weight comprising a cylindrical member having a longitudinal tapered channel therethrough of oval cross section, said member being longitudinally split into two half sections along the minor axis of the oval, releasable means for securing said sections together, rubber cushions recessed in the channel along the walls thereof at the ends of the major axis of the oval, cleats carried on the outer face of said cushions, and means for securing said cleats to said cushions.

3. A horn weight comprising a cylindrical member having a longitudinal tapered channel therethrough of oval cross section, said member being longitudinally split into two half sections along the minor axis of the oval, releasable means for securing said sections together, rubber cushions recessed in the channel along the walls thereof at the ends of the major axis of the oval, cleats carried on the outer face of said cushions and head screws for securing said cleats to the cushions, said screws passing through the cushions from the back thereof, the heads of the screws being deeply recessed in the cushions so as to be normally out of contact with the member.

HAROLD J. PICKER.

REFERENCES CITED

The following references are of record in the file of this patent:

UNITED STATES PATENTS

| Number | Name | Date |
| --- | --- | --- |
| 1,499,114 | Makin | June 24, 1924 |
| 2,244,810 | Stone | June 10, 1941 |
| 2,247,724 | Clarke | July 1, 1941 |